United States Patent
Faulkner

(10) Patent No.: US 7,826,808 B2
(45) Date of Patent: Nov. 2, 2010

(54) METHOD, APPARATUS AND SYSTEM FOR AN OMNI DIGITAL PACKAGE FOR REDUCING INTERFERENCE

(75) Inventor: John Meredith Faulkner, Melbourne Beach, FL (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 579 days.

(21) Appl. No.: 11/850,852

(22) Filed: Sep. 6, 2007

(65) Prior Publication Data

US 2009/0068965 A1    Mar. 12, 2009

(51) Int. Cl.
H04B 1/04       (2006.01)
H04B 15/00     (2006.01)

(52) U.S. Cl. ................. 455/114.2; 455/114.1; 455/501; 455/570

(58) Field of Classification Search .............. 455/114.1, 455/114.2, 115.1, 295, 296, 307, 501, 570
See application file for complete search history.

(56) References Cited

U.S. PATENT DOCUMENTS

| | | | |
|---|---|---|---|
| 4,701,935 A * | 10/1987 | Namiki | 375/214 |
| 5,619,503 A * | 4/1997 | Dent | 370/330 |
| 5,729,829 A * | 3/1998 | Talwar et al. | 455/63.1 |
| 6,385,435 B1 * | 5/2002 | Lee | 455/24 |
| 6,567,648 B1 * | 5/2003 | Ahn et al. | 455/83 |
| 6,714,775 B1 * | 3/2004 | Miller | 455/296 |
| 6,968,171 B2 * | 11/2005 | Vanderhelm et al. | 455/296 |
| 7,058,368 B2 * | 6/2006 | Nicholls et al. | 455/114.2 |
| 7,197,282 B2 * | 3/2007 | Dent et al. | 455/67.14 |
| 7,606,137 B2 * | 10/2009 | Shattil | 370/208 |
| 2002/0197958 A1 * | 12/2002 | Collins et al. | 455/63 |
| 2007/0009012 A1 * | 1/2007 | Carrivan et al. | 375/144 |

* cited by examiner

*Primary Examiner*—Duc M Nguyen
(74) *Attorney, Agent, or Firm*—Alston & Bird LLP

(57) ABSTRACT

A system for an omni digital package for reducing interference may include a passive combiner and a transmit signal canceller. The passive combiner may be configured to combine at least two input frequencies to produce a combined signal. The transmit signal canceller may be configured to determine an interference frequency based on a combination of the at least two input frequencies. The transmit signal canceller may include a tap weight determiner configured to determine a weighting coefficient associated with the interference frequency, and a cancellation function configured to perform a cancellation operation to at least partially cancel the interference frequency from the combined signal based on the weighting coefficient.

18 Claims, 3 Drawing Sheets

METHOD, APPARATUS AND SYSTEM FOR AN OMNI DIGITAL PACKAGE FOR REDUCING INTERFERENCE

FIELD OF THE INVENTION

Embodiments of the present invention relate generally to signal interference, and more particularly, to providing a method, system and apparatus for reducing effects of interference.

BACKGROUND OF THE INVENTION

There are currently numerous methods of wireless communication available, many of which may operate over different frequencies and require dedicated transmission and/or reception suites. Some buildings or platforms, such as ships, aircraft, vehicles, etc., may need or otherwise desire a capability to communicate via more than one of the available communication methods. Moreover, many buildings or platforms may also employ one or more electronic sensors that may each also include dedicated transmission and/or reception suites. Accordingly, not only can spaces such as the topside area of a ship become crowded with equipment to support such an environment, but the environment can also become crowded with numerous potentially interfering signals. When many signals are submitted, for example, to an antenna suite, harmonics may be generated based on two tone or multi-tone interactions. As a result, various signals may radiate into one another and create a mixer effect at an amplifier stage of a transmitter. The mixed signals may also be communicated into receive architecture when returns are received and may, as a result, raise the interference level for other in band desirable signals and particularly those desirable signals of relatively lower power levels.

To date, elaborate filter setups have been employed in an effort to restrict co-site interference conditions such as those described above. However, such elaborate filter setups may limit both the spectrum assignment and freedom to allocate frequency hopping, which may aid link survivability in certain environments. Additionally, such elaborate filter setups may be complex and expensive to maintain.

Accordingly, it may be desirable to provide a mechanism by which to reduce interference levels, particularly if such reduction of interference levels can be achieved in a manner that is also capable of overcoming at least some of the disadvantages described above.

BRIEF SUMMARY OF THE INVENTION

In order to overcome at least some of the disadvantages described above, embodiments of the present invention may provide a technical solution or package for reducing interference in a multi-signal environment. In this regard, transmit signal levels may be received in their radio frequency (RF) form and passed into a linear passive coupler or combiner in order to determine and account for likely interference frequencies in advance. The likely interference frequencies may then be at least partially canceled prior to reaching the amplification stages of a transmitter. Moreover, attempts to cancel interference frequencies may be made in an iterative fashion to further improve interference reduction. In an exemplary embodiment, interference cancellation may also be practiced upon received return signals (e.g., radar returns) to yet further improve interference reduction.

In one exemplary embodiment, a method for reducing interference is provided. The method may include determining an interference frequency based on a combination of at least two input frequencies, receiving a combined signal including the at least two input frequencies, determining a weighting coefficient associated with the interference frequency, and performing a cancellation operation to at least partially cancel the interference frequency from the combined signal based on the weighting coefficient.

In another exemplary embodiment, an apparatus for reducing interference is provided. The apparatus may include a transmit signal canceller. The transmit signal canceller may be configured to determine an interference frequency based on a combination of at least two input frequencies. The transmit signal canceller may also be configured to receive a combined signal including the at least two input frequencies. The transmit signal canceller may include a tap weight determiner configured to determine a weighting coefficient associated with the interference frequency. The transmit signal canceller may also include a cancellation function configured to perform a cancellation operation to at least partially cancel the interference frequency from the combined signal based on the weighting coefficient.

In another exemplary embodiment, a system for reducing interference is provided. The system may include a passive combiner and a transmit signal canceller. The passive combiner may be configured to combine at least two input frequencies to produce a combined signal. The transmit signal canceller may be configured to determine an interference frequency based on a combination of the at least two input frequencies. The transmit signal canceller may include a tap weight determiner configured to determine a weighting coefficient associated with the interference frequency, and a cancellation function configured to perform a cancellation operation to at least partially cancel the interference frequency from the combined signal based on the weighting coefficient.

Embodiments of the invention may provide an increased ability to reduce the effects of interference in a multi-signal environment. As a result, system capabilities may be enhanced without substantially increasing system complexity and cost.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
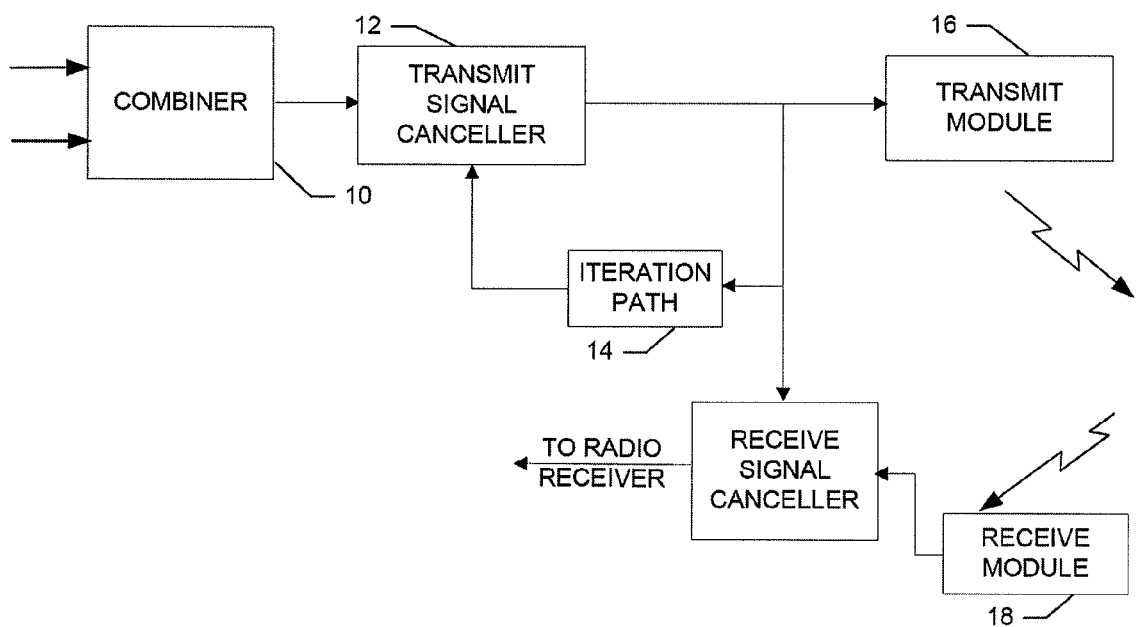
FIG. 1 is a diagram illustrating an exemplary architecture for reducing interference according to an exemplary embodiment of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a diagram illustrating an exemplary architecture for reducing interference according to an exemplary embodiment of the present invention. As shown in FIG. 1, the architecture may include a plurality of devices or elements such as a combiner 10, a transmit signal canceller 12, a transmission module 16, a receive module 18, and a receive signal canceller 20. In an exemplary embodiment, each of the combiner 10, the transmit signal canceller 12, and the receive signal canceller 20 may each be any device or means embodied in either hardware, software, or a combination of hardware and software configured to perform the corresponding functions of the combiner 10, the transmit signal canceller 12, and the receive signal canceller 20 as described below. Meanwhile, the transmission module 16 and the receive module 18 may each include a respective antenna or antennae for the transmission and receipt of signals, respectively. The transmission module 16 and the receive module 18 may also include corresponding amplification and/or coupling devices as described, for example, in greater detail below.

In an exemplary embodiment, the combiner 10 may be embodied as a linear passive coupler configured to receive a plurality of desired radio frequency (RF) transmit signals and combine the received signals. Combination of the signals in the combiner 10 may provide for signal combination with a relatively limited non-linear action that is normally experienced with regard to linear active devices and multi-antenna coupling due to the passive linear nature of the combiner 10.

An output of the combiner 10 may be communicated to the transmit signal canceller 12, which may be configured to convert the combined RF transmit signals into a digital signal (e.g., via an analog-to-digital converter (ADC)) and to provide an identification of interference frequencies. The interference frequencies may then be assigned corresponding weighting coefficients by the transmit signal canceller 12 for use in cancellation of the interference frequencies. In an exemplary embodiment, the digital signal corresponding to the combined RF transmit signals may be mixed with the weighted coefficients in order to at least partially cancel the interference frequencies.

An output of the transmit signal canceller 12, which may represent a digital signal corresponding to the combined RF transmit signals with interference frequencies at least partially canceled out, may then be communicated to the transmission module 16. The transmission module 16 may be configured to convert the digital signal received from the transmit signal canceller 12 back into an RF signal (e.g., via a digital-to-analog converter (DAC)) for transmission by an antenna of the transmission module 16.

In an exemplary embodiment, a portion of the RF signal that is to be transmitted may be fed back to the transmit signal canceller 12 via an iteration path 14 in order to enable one or more iterations of determining changes to the weighting coefficients originally assigned by the transmit signal canceller 12 based on actual characteristics of the RF signal that is to be transmitted. In other words, the originally assigned weighting coefficients may account for partial cancellation of the interference frequencies present in the RF signal that is to be transmitted. Thus, by feeding back a signal corresponding to the RF signal that is to be transmitted, the transmit signal canceller 12 may determine which and to what degree interference frequencies are still present in the RF signal that is to be transmitted. The transmit signal canceller 12 may then be configured to change at least some of the weighting coefficients to attempt to improve the cancellation of the interference frequencies. Changing of the weighting coefficients may be practiced in an iterative fashion to provide further improvements in interference frequency cancellation. In one exemplary embodiment, experimental data showed about an 18 dB improvement with regard to interference reduction after one iteration, a further 6 dB improvement after a second iteration, and a further 3 dB improvement after a third iteration. Improvement beyond the third iteration, while possible, may in some cases not provide sufficient benefit to justify the operation.

Another portion of the RF signal that is to be transmitted may be communicated to the receive signal canceller 20. In this regard, the receive signal canceller 20 may include a delay function to provide a delay in the RF signal that is to be transmitted. The delay provided by the receive signal canceller 20 may be substantially equal to a known or measured physical RF delay experienced between transmission and receipt of a particular signal. The delayed signal may then be used to cancel out transmit portions of an RF signal received from the receive module 18. In this regard, when the RF signal is received at the receive module 18 and communicated to the receive signal canceller 20, the received RF signal may include a desirable receive signal portion and an undesirable transmit signal portion (which may include interference tones). However, the transmit signal portion may be canceled out by the receive signal canceller 20 using the delayed signal corresponding to the RF signal that is to be transmitted. As a result, the receive signal canceller 20 may provide an output of desired frequencies that may be communicated to a radio receiver for processing.

Figure 2:
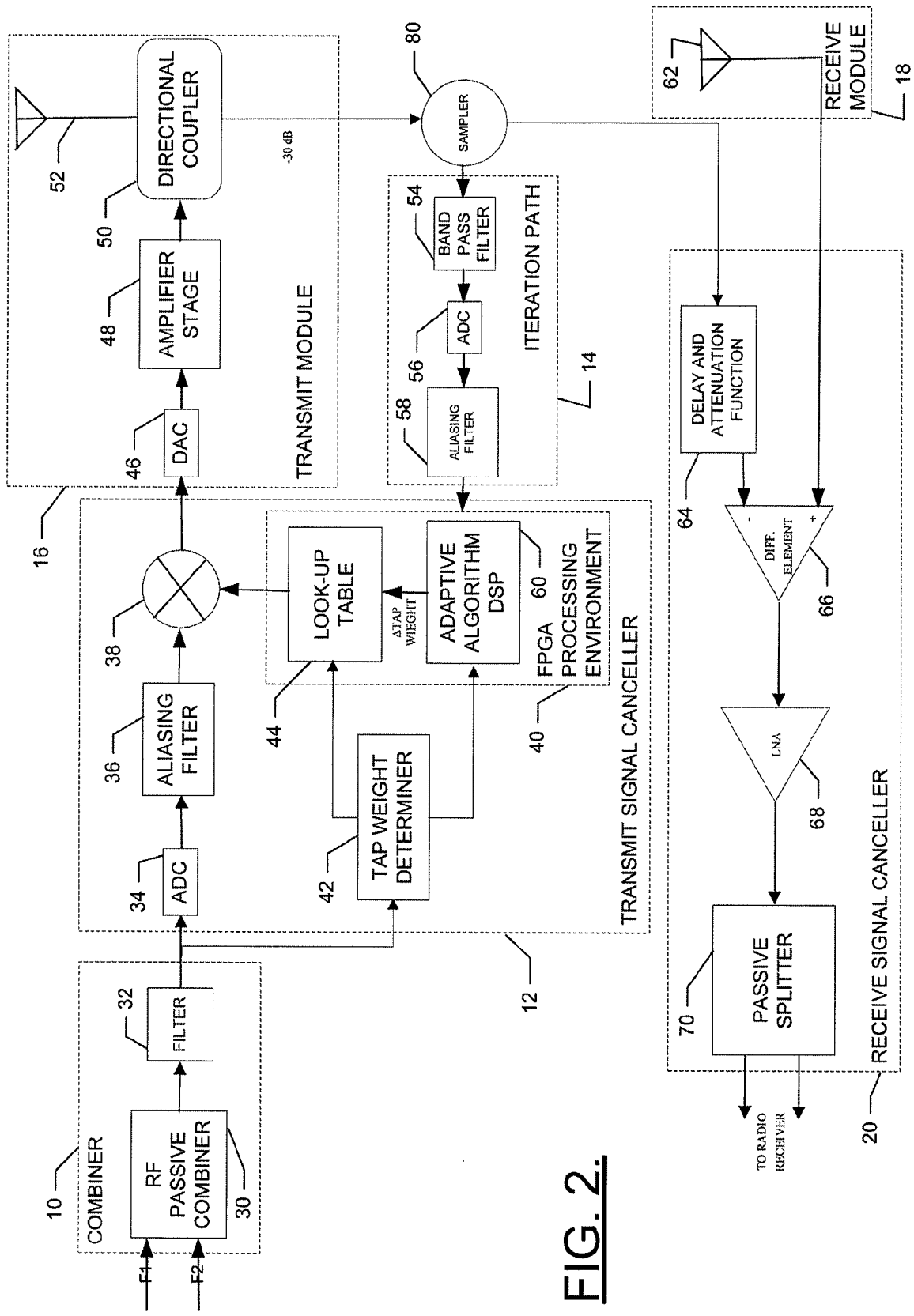
FIG. 2 illustrates a more detailed example of an implementation of an embodiment of the present invention.

FIG. 2 illustrates a more detailed example of an implementation of an embodiment of the present invention. However, it should be noted that embodiments of the present invention, as described above with reference to FIG. 1, may be structured in different ways to achieve the functionality described above. As such, FIG. 2 should be recognized to illustrate one exemplary embodiment of the present invention and thus, the specific elements described in reference to FIG. 2 are provided by way of example and not of limitation.

As shown in FIG. 2, the combiner 10 according to one exemplary embodiment, may include an RF passive combiner 30 (e.g., a 50 $\Omega$RF passive combiner) and a filter 32. The filter 32 may be designed to filter out specified undesirable frequencies. The RF passive combiner 30 may be configured to receive and combine a plurality of pre-selected frequencies. In an exemplary embodiment, the frequencies may be in a range from about 30 MHz to about 176 MHz, although other frequency ranges could also be employed based on the analog-to-digital conversion performance. As discussed above, since the RF passive combiner 30 is a linear passive device, the lack of active components may reduce the production of interference frequencies or nonlinearity. In an exemplary embodiment, the RF passive combiner 30 may be comprised of a plurality of resistors configured in a resistor network for combining signals.

The transmit signal canceller 12 may include an ADC 34, an aliasing filter 36 and a cancellation function (e.g. a mixer 38) as shown in FIG. 2. The ADC 34 may be configured to, as described above, convert the combined RF transmit signals from the combiner 10 into a digital signal. The ADC 34 according to an exemplary embodiment may be a wideband device capable of processing at least four bits per Hz for a bandwidth corresponding to the desired transmit spectrum. The digital signal may then be filtered using the aliasing filter 36, which may be any known aliasing filter, prior to being communicated to the mixer 38. The mixer 38 of this embodiment may be any suitable mixing element and may be configured to mix the digital signal with an output from a field programmable gate array (FPGA) processing environment 40 in order to at least partially cancel or eliminate interference frequencies in the digital domain. In this regard, the FPGA processing environment 40, which could be embodied in an FPGA, may be configured to provide particular frequencies with weighted values to the mixer 38 in which the particular frequencies are interference frequencies that may be identified based on expected interference frequencies associated with the RF frequencies combined in the combiner 10 (e.g., sum and difference frequencies produced by the well known interference two-tone equation (2F1 (+/−) F2, where F1 and F2 are each transmit frequencies). In an exemplary embodiment, the weighting coefficients may be negative such that, when mixed with the digital signal, the result at least partially cancels interference frequencies in the output of the transmit signal canceller 12 (which may also be the output of the mixer 38).

In an exemplary embodiment, a tap weight determiner 42 may be utilized to receive the combined RF transmit signals from the combiner 10 and to determine a set of weighting coefficients including a weighting coefficient corresponding to each of the expected interference frequencies identified. The weighting coefficients may then be communicated to the FPGA processing environment 40 for mixing with the digital signal received (and possibly filtered thereafter) from the ADC 34. The FPGA processing environment 40 may be further configured to account for uncanceled interference frequencies by changing the weighting coefficients based on feedback received via the iteration path 14 as described in greater detail below.

In an exemplary embodiment, the tap weight determiner 42 may receive information identifying the interference frequencies based on a fast Fourier transform (FFT) sequence run on the digital signal which divides the individual spectrum components of the digital signal out into digital equivalent signals. The interference frequencies may then be determined based on the digital equivalent signals. The interference frequencies may be identified in frequency and amplitude for each of the digital equivalent signals and a corresponding weighting coefficient may be assigned to each of the digital equivalent signals. The weighting coefficients may be determined by the tap weight determiner 42, in one exemplary embodiment, by taking 10 log of the amplitude of a mix product for two frequencies to get a dB value, which may be converted in the digital domain to produce a corresponding weighting coefficient. In an exemplary embodiment, a series of weighting coefficients corresponding to various frequencies may be stored in a look up table (LUT) 44 that may form a portion of the FPGA processing environment 40. Thus, for example, the tap weight determiner 42 may determine initial weighting coefficients that may be stored in the LUT 44 for use by the mixer 38 (e.g., digital mixer) to at least partially cancel interference frequencies. However, as will be seen below, the iteration path 14 may provide the LUT 44 with modifications to the coefficients during operation.

An output of the mixer 38, which output may be thought of as a digital signal corresponding to the combined RF transmit signals having the interference frequencies at least partially canceled out, may then be communicated to the transmission module 16 for transmission. As such, in order to condition the digital signal received from the mixer 38 for transmission, the transmission module 16 may include a DAC 46, an amplifier stage 48, a directional coupler 50 and a transmit antenna 52. The DAC 46 may be any suitable DAC configured to convert the digital signal received from the mixer 38 to an analog RF signal to be transmitted that may be amplified by an amplifier stage 48. In this regard, a suitable DAC may be a DAC that provides conversion at relatively high processing speed with bandwidth capabilities similar to those of the ADC 34 with respect to the frequency spectrum of interest. In an exemplary embodiment, the amplifier stage 48 may include one or more pre-amplifiers and/or power amplifiers for raising a power level of the RF signal to be transmitted prior to transmission by the transmit antenna 52. The pre-amplifiers and/or power amplifiers may be any known amplifiers selected for having suitable characteristics for the frequency spectrum of interest.

As indicated in FIG. 2, the directional coupler 50 may be configured to split the amplified RF signal to be transmitted to drive the transmit antenna 52 and to provide a feedback signal via the iteration path 14. In an exemplary embodiment, the directional coupler may be a 30 dB passive linear directional coupler configured to pass the 30 dB down signal to the iteration path 14. In this regard, the iteration path 14 may include a band pass filter 54 (e.g., matching the pass band of the input RF signals of between about 30 MHz and about 176 MHz). The output of the band pass filter 54 may then be passed through another ADC 56 and a corresponding additional aliasing filter 58 prior to reaching the FPGA processing environment 40. In an exemplary embodiment, as described above, the iteration path 14 may feed back actual information about the RF signal to be transmitted that is reflective of actual system characteristics that may not have been anticipated by theoretical considerations. The feedback may then be used in order to determine changes to the values of the LUT 44 to effectively change the weighting coefficients based on actual performance criteria.

In an exemplary embodiment, in addition to the LUT 44, the FPGA processing environment 40 may also include an adaptive algorithm digital signal processor (DSP) 60. The adaptive algorithm DSP 60 may be any device or means embodied in either hardware, software, or a combination of hardware and software configured to determine a change in the weighting coefficient (e.g., Δ tap weight) based on a difference between coefficients determined by the tap weight determiner 42 as compared to weights actually exhibited based on the characteristics of the RF signal to be transmitted. In other words, the DSP 60 may be configured to determine the Δ tap weight values (e.g., digital finite impulse response (FIR) values) to account for actual system characteristics. The adaptive algorithm DSP 60 may then communicate the Δ tap weight values to the LUT 44 to modify the contents of the LUT 44 to reflect updated weighting coefficients. Accordingly, given that the FPGA processing environment 40 and the iteration path 14 may process data with sufficient speed to digitize and determine weighting coefficients for pre-distortion determinations, improvements in interference reduction may be achieved. Furthermore, as discussed above, more than one iteration of changing the weighting coefficients may be provided.

In an exemplary embodiment in which the present invention is practiced in the context of, for example, a radar signal or some other environment in which a return signal is received on the basis of the transmitted signal, in addition to providing the iteration path 14, cancellation of the transmit signal may be provided by the receive signal canceller 20. In this regard, when the received signal (e.g., corresponding to the RF signal that was to be transmitted) is received at a receive antenna 62 of the receive module 18, the received signal may be communicated to the receive signal canceller 20 along with a sampled signal corresponding to the RF signal that was to be transmitted (e.g., sampled by a sampler 80). In this regard, as described above, the receive signal canceller 20 may include a delay and attenuation element 64. The delay and attenuation element 64 may be any device or means embodied in either hardware, software, or a combination of hardware and software configured to provide a delay in the sampled portion of the RF signal that was to be transmitted that is provided to the receive signal canceller 20. As indicated above, the delay and attenuation provided by the delay and attenuation element 64 may be substantially equal to a known or measured physical RF delay and attenuation experienced between transmission and receipt of a particular signal. Cancellation may then be performed to cancel out transmit portions of an RF signal received (e.g., the received signal) from the receive module 18. In this regard, the receive signal canceller 20 may include a difference element 66 such as a unity gain op amp configured to receive the received signal from the receive module 18 and the delayed and attenuated signal from the delay and attenuation element to determine a difference therebetween, which may generally correspond to the desirable receive signal portion of the received signal (e.g., with reduced interference). The desirable receive signal may then be communicated to a radio receiver, for example, via a low noise amplifier (LNA) 68 and/or a passive splitter 70 that may split the desirable receive signal into individual signals corresponding to the input frequencies at the transmitter end.

Accordingly, embodiments of the present invention may provide multiple iteration feedback for interference cancellation. Embodiments may additionally provide a unity transmit cancellation circuit (e.g., the receive signal canceller 20) with equalized spectral component delays. Thus, pre-distortion interference cancellation may be performed for a plurality of frequencies to be transmitted and, upon receipt of returns corresponding to the frequencies transmitted, transmit signal cancellation may also be practiced. Reduction in interference may therefore be experienced to improve system performance.

Figure 3:
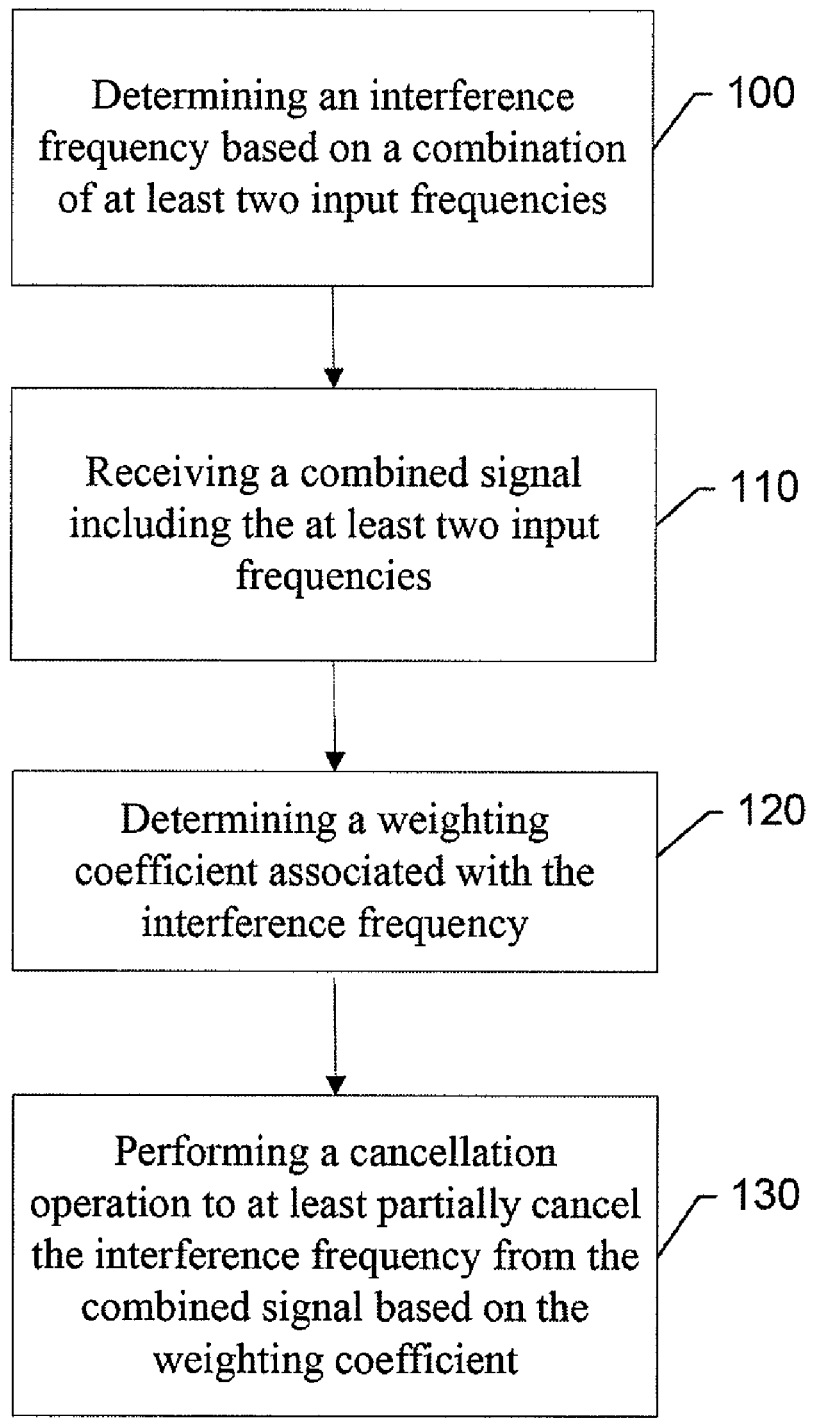
FIG. 3 shows a flowchart of a system and method for providing interference reduction according to an exemplary embodiment of the present invention.

FIG. 3 is a flowchart of a method according to exemplary embodiments of the invention. It will be understood that each block or step of the flowchart, and combinations of blocks in the flowchart, can be implemented by various means, such as hardware, firmware, and/or software including one or more computer program instructions. Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing an omni digital package for interference reduction may include determining an interference frequency based on a combination of at least two input frequencies at operation 100. At operation 110, a combined signal including the at least two input frequencies may be received. In an exemplary embodiment, operation 110 may include receiving the combined signal as a combination of radio frequency signals combined in a passive combiner. A weighting coefficient (e.g., a digital FFT weighted coefficient) associated with the interference frequency may be determined at operation 120. The method may further include performing a cancellation operation to at least partially cancel the interference frequency from the combined signal based on the weighting coefficient at operation 140.

In an exemplary embodiment, the method may further include an operation of converting the combined signal to a digitized combined signal and operation 120 may include determining a plurality of weighting coefficients in which each one of the weighting coefficients corresponds to a respective interference frequency. Operation 140 may therefore include mixing the weighting coefficients with the digitized combined signal. In one exemplary embodiment, the weighting coefficients may be stored in a look up table for use as an input for mixing the weighting coefficients with the digitized combined signal. In addition or alternatively, the weighting coefficients may be updated based on a comparison of the weighting coefficients to characteristics of a signal produced based on the cancellation operation. In this regard, updating the weighting coefficients may include iteratively updating the weighting coefficients by making adjustments to a look up table including the weighting coefficients following more than one application of the cancellation operation based on changed weighting coefficients.

In another exemplary embodiment, the method may further include an operation of converting an output of the cancellation operation to an analog signal to produce a transmission signal. A delay and attenuation function may then be applied to the transmission signal and a difference between a received signal and the delayed and attenuated transmission signal may be determined. In an exemplary embodiment, applying the delay and attenuation function to the transmission signal may include applying the delay and attenuation function to a reduced-power version of the transmission signal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing interference reduction, the method comprising:

determining an interference frequency based on a combination of at least two input frequencies;

receiving a combined signal including the at least two input frequencies;

converting the combined signal to a digitized combined signal;

determining a weighting coefficient associated with the interference frequency; and performing a cancellation operation to at least partially cancel the interference frequency from the combined signal based on the weighting coefficient, wherein determining the weighting coefficient comprises determining a plurality of weighting coefficients in which each one of the weighting coefficients corresponds to a respective interference frequency, and wherein performing the cancellation operation comprises mixing the weighting coefficients with the digitized combined signal.

2. The method of claim 1, wherein receiving the combined signal comprises receiving the combined signal as a combination of radio frequency signals combined in a passive combiner.

3. The method of claim 1, further comprising storing the weighting coefficients in a look up table for use as an input for mixing the weighting coefficients with the digitized combined signal.

4. The method of claim 1, further comprising updating the weighting coefficients based on a comparison of the weighting coefficients to characteristics of a signal produced based on the cancellation operation.

5. The method of claim 4, wherein updating the weighting coefficients comprises iteratively updating the weighting coefficients by making adjustments to a look up table including the weighting coefficients following more than one application of the cancellation operation based on changed weighting coefficients.

6. The method of claim 1, further comprising converting an output of the cancellation operation to an analog signal to produce a transmission signal.

7. The method of claim 6, further comprising:
applying a delay and attenuation function to the transmission signal; and
determining a difference between a received signal and the delayed and attenuated transmission signal.

8. The method of claim 7, wherein applying the delay and attenuation function to the transmission signal comprises applying the delay and attenuation function to a reduced-power version of the transmission signal.

9. A system for providing interference reduction, the system comprising:
a passive combiner configured to combine at least two input frequencies to produce a combined signal;
a transmit signal canceller configured to determine an interference frequency based on a combination of the at least two input frequencies; and
an analog-to-digital converter for converting the combined signal to a digitized combined signal,
wherein the transmit signal canceller includes a tap weight determiner configured to determine a weighting coefficient associated with the interference frequency, and a cancellation function configured to perform a cancellation operation to at least partially cancel the interference frequency from the combined signal based on the weighting coefficient, and
wherein the transmit signal canceller is further configured to determine a plurality of weighting coefficients in which each one of the weighting coefficients corresponds to a respective interference frequency, and wherein the transmit signal canceller further includes a mixer configured to perform the cancellation operation by mixing the weighting coefficients with the digitized combined signal.

10. The system of claim 9, wherein the passive combiner comprises a resistor network.

11. The system of claim 9, further comprising a look up table configured to store the weighting coefficients for use as an input to the mixer.

12. The system of claim 9, further comprising an iteration path configured to enable updating the weighting coefficients based on a comparison of the weighting coefficients to characteristics of a signal produced by the mixer.

13. The system of claim 12, wherein the iteration path enables iteratively updating the weighting coefficients by making adjustments to a look up table including the weighting coefficients following more than one application of the cancellation operation based on changed weighting coefficients.

14. The system of claim 9, further comprising a digital-to-analog converter for converting an output of the cancellation function to an analog signal to produce a transmission signal.

15. The system of claim 14, further comprising:
a delay and attenuation function disposed to delay and attenuate the transmission signal; and
a difference element in communication with the delay and attenuation function, the difference element being configured to determine a difference between a received signal and the delayed and attenuated transmission signal.

16. The system of claim 15, further comprising a directional coupler configured to divert a reduced-power version of the transmission signal to the delay and attenuation function.

17. An apparatus for providing interference reduction, the apparatus comprising:
a transmit signal canceller configured to determine an interference frequency based on a combination of at least two input frequencies and configured to receive a combined signal including the at least two input frequencies; and
a digitizer for converting the combined signal to a digitized combined signal,
wherein the transmit signal canceller includes a tap weight determiner configured to determine a weighting coefficient associated with the interference frequency, and a cancellation function configured to perform a cancellation operation to at least partially cancel the interference frequency from the combined signal based on the weighting coefficient, and
wherein the transmit signal canceller is further configured to determine a plurality of weighting coefficients in which each one of the weighting coefficients corresponds to a respective interference frequency, and wherein the transmit signal canceller is further configured to perform the cancellation operation by mixing the weighting coefficients with the digitized combined signal.

18. The apparatus of claim 17, further comprising an iteration path configured to enable updating the weighting coefficients based on a comparison of the weighting coefficients to characteristics of a signal produced by the mixer.

* * * * *